(12) United States Patent
Matsuo et al.

(10) Patent No.: US 7,199,523 B2
(45) Date of Patent: Apr. 3, 2007

(54) COLD CATHODE FLUORESCENT LAMP AND BACKLIGHT UNIT

(75) Inventors: Kazuhiro Matsuo, Takatsuki (JP); Kenji Yamada, Fukuchiyama (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 354 days.

(21) Appl. No.: 10/979,306

(22) Filed: Nov. 2, 2004

(65) Prior Publication Data

US 2005/0179389 A1   Aug. 18, 2005

(30) Foreign Application Priority Data

Nov. 10, 2003 (JP) .............................. 2003-380463
Oct. 13, 2004 (JP) .............................. 2004-299290

(51) Int. Cl.
*H01J 17/16* (2006.01)

(52) U.S. Cl. ...................................... 313/636; 313/493

(58) Field of Classification Search ................ 313/480, 313/493, 636
See application file for complete search history.

(56) References Cited

U.S. PATENT DOCUMENTS 5,557,171 A * 9/1996 Marlor et al. ................ 313/636

FOREIGN PATENT DOCUMENTS

JP   2003-073142   3/2003
JP   2003-167250   6/2003

* cited by examiner

*Primary Examiner*—Vip Patel

(57) ABSTRACT

A cold cathode fluorescent lamp includes a light-emitting tube made from borosilicate glass doped with 5.1–9.0 wt % of an ultraviolet light absorbent, the light-emitting tube having phosphors coated on an inner surface thereof, and mercury and a rare gas enclosed therein. As a result, 313 nm UV light in addition to 254 nm UV light is sufficiently blocked, thus enabling the provision of cost-effective CCFLs that do not readily cause a reduction in the surface brightness of backlight units.

6 Claims, 11 Drawing Sheets

COLD CATHODE FLUORESCENT LAMP AND BACKLIGHT UNIT

This application is based on applications no. 2003-380463 and no. 2004-299290 filed in Japan, the content of which is hereby incorporated by reference.

BACKGROUND OF THE INVENTION

1. Field of the Invention

The present invention relates to a backlight unit used in liquid crystal display (LCD) televisions, LCD monitors and the like, and a cold cathode fluorescent lamp (CCFL) forming the main light source of the backlight unit, and particularly to backlight units and CCFLs for use in large LCD TVs.

2. Related Art

In recent years, there has been increasing demand for LCD televisions, LCD monitors and the like, as well as for backlight units used in these devices. In terms of backlight units, there is the edge-lit type used in LCD monitors for PCs and small LCD TVs etc., and the direct-lit type used in large LCD TVs etc.

Generally, a direct-lit backlight unit includes a plurality of CCFLS, a diffusion plate disposed on a light-emission side of the backlight unit, and a reflective plate disposed on a light-reflecting side of the backlight unit. A diffusion sheet and a lens sheet are disposed on the light-emission side of the diffusion plate, and the LCD panel of an LCD TV is disposed on the light-emission side of the lens sheet. These plates and sheets are generally made of resin.

CCFLs are ideal for reducing the depth and weight of backlight units given the small-diameter, thin-walled construction of the light-emitting tubes, which are formed using borosilicate glass. Owning to its high melting point in comparison with soda lime glass, borosilicateglass does not deform at the baking temperature of the phosphors, even when used in small-diameter, thin-walled light-emitting tubes, and its high mechanical strength makes it robust.

The borosilicate glass (also called hard glass or heat-resistant glass) referred to here includes boron oxide ($B_2O_3$) at 9 wt % or greater, this being the largest component after silicon dioxide ($SiO_2$). Soda lime glass includes sodium oxide ($Na_2O$), calcium oxide (CaO) and the like as primary components, with only a small amount of boron oxide present. Note that materials such as kalium oxide ($K_2O$) are sometimes used in soda lime glass in place of sodium oxide ($Na_2O$).

CCFLs generate visible light by using ultraviolet light (hereinafter "UV light" or simply "UV") irradiated by discharges in a low-pressure mercury vapor to excite phosphors. The line spectrum of the irradiated UV light peaks at wavelengths including 254 nm, 313 nm, and 365 nm.

Some of the UV light irradiated from the discharges, however, passes through the phosphors and leaks to the outside of the light-emitting tube, where it is irradiated onto the diffusion and reflection plates of the backlight unit. UV light causes resin members such as the diffusion and reflection plates to deteriorate and discolor, resulting in a loss of transparency and transmissivity. The surface brightness of the backlight unit is consequently reduced after a relatively short operating time.

To block UV light passing through the phosphors with the light-emitting tube so as to prevent the leaking of UV light, the light-emitting tube is doped with a UV absorbent. That is, a UV absorbent is included in the light-emitting tube as one of the components constituting the borosilicate glass. Titanium oxide ($TiO_2$), cerium oxide ($CeO_2$) and zinc oxide ($ZnO_2$) are examples of UV absorbents, with a typical light-emitting tube being doped with approximately 0.5 wt % titanium. Doping the light-emitting tube with titanium at approximately 0.5 wt % makes it possible to almost completely block 254 nm UV light, which has the most detrimental effect on the surface brightness of the backlight unit. On the other hand, 313 nm and 365 nm UV light cannot be sufficiently blocked, even by the doping of titanium at approximately 0.5 wt %.

Japanese Published Patent Application No. 2003-167250 discloses a backlight unit having little reduction in surface brightness because of UV light being blocked over an extremely wide wavelength region. FIG. 1 is a schematic view showing a main section of a CCFL according to the above application. In CCFL 30, a UV absorbent layer 33 (0.02–0.5 mg/cm$^3$) is formed between the inner surface of a light-emitting tube 31 and a phosphor layer 32, in addition to the borosilicateglass of tube 31 being doped with 0.1–0.8 wt % of a UV absorbent.

Japanese Published Patent Application No. 2003-73142 discloses a lighting glass with little excess UV light and excellent heat treatability, that is targeted for use in fluorescent lights, incandescent bulbs and the like. The disclosed lighting glass is soda lime glass doped with 0.05–3.0 wt % titanium oxide or cerium oxide as the UV absorbent.

In recent years LCD TVs have been increasing in size, with large LCD TVs having screens in excess of 17 inches now in widespread use. Large LCD TVs employ PC (polycarbonate) resin diffusion plates rather than the acrylic resin diffusion plates used by small LCD TVs.

The high absorbency of acrylic resin means that acrylic resin diffusion plates easily warp due to absorption, and given that the measurement error from warping also increases with increases in the size of the diffusion plate, problems readily occur in the design of backlight units. PC resin, on the other hand, has excellent anti-absorbency, mechanical strength, heat resistance and light transmittance characteristics, which means that the above problems do not arise since there is hardly any warping due to absorption with diffusion plates made of PC resin.

However, a problem with the PC resin diffusion plates employed in large LCD TVs having screens in excess of 17 inches was that the deterioration and discoloration due to UV light occurred more readily than with the acrylic resin diffusion plates employed in small LCD TVs. As such, the inventors identified the marked deterioration/discoloration of PC resin diffusion plates due to 313 nm UV light, which was not really a problem with the acrylic resin diffusion plates.

Also, the difficultly, with CCFL 30 in the above Published Patent Application No. 2003-167250, of adhering the UV absorbent evenly to the inner surface of light-emitting tube 31 due to the small diameter of the tube, meant that the adhered amount of UV absorbent fluctuated in a lengthwise direction of the tube. Light-emitting tube 31 was particularly susceptible to fluctuations in the adhered amount of UV absorbent because of its long length. Consequently, UV light was insufficiently blocked in areas where the adhered amount of UV absorbent was reduced due to the fluctuations.

In addition, the need for a process of adhering the UV absorbent to the inner surface of light-emitting tube 31 in the manufacture of CCFL 30 caused a hike in production costs.

On the other hand, light-emitting tubes for CCFLs could not be manufactured with the lighting glass of the above Published Patent Application No. 2003-73142 because of the use of soda lime glass. As described above, soda lime glass has a lower melting point than borosilicate glass, which means that the light-emitting tube readily deforms at the baking temperature of the phosphors, and also the low mechanical strength of soda lime glass makes the light-emitting tube susceptible to breakage.

SUMMARY OF THE INVENTION

An object of the present invention is to provide a cost-effective cold cathode fluorescent lamp (CCFL) that does not readily cause a reduction in the surface brightness of a backlight unit, as a result of 313 nm UV light in addition to 254 nm UV light being sufficiently blocked.

The above object is achieved by a CCFL that includes alight-emitting tube made from borosilicateglass doped with a UV light absorbent in a range of 5.1 wt % to 9.0 wt %, phosphors coated on an inner surface of the light-emitting tube, mercury enclosed within the light-emitting tube, and a rare gas enclosed as a buffer gas within the light-emitting tube.

With this structure, 313 nm UV light is sufficiently blocked without reducing lamp brightness, in addition to also effectively blocking UV light of other wavelengths. Consequently, it is possible to suppress any deterioration or discoloration of diffusion and refection plates due to 313 nm and other UV light, and thus suppress any drop in the surface brightness of the backlight unit.

The UV absorbent may be at least one member selected from the group consisting of titanium oxide, cerium oxide and zinc oxide.

This structure facilitates the spreading of the UV absorbent uniformly throughout the entire light-emitting tube, thus stabilizing the UV blocking effect. Furthermore, there is no increase in production costs, given that this CCFL can be manufactured using a similar process to conventional CCFLs.

A further object of the present invention is to provide a backlight unit that is resistant to reductions in surface brightness.

This further object is achieved by a backlight unit that includes a CCFL having a light-emitting tube made from borosilicate glass doped with a UV light absorbent in a range of 5.1 wt % to 9.0 wt %, phosphors coated on an inner surface of the light-emitting tube, mercury enclosed within the light-emitting tube, and a rare gas enclosed as a buffer gas within the light-emitting tube. Reductions in surface brightness do not readily occur with this structure, as a result of diffusion and reflection plates in the backlight unit being resistant to deterioration and discoloration from UV light.

This further object may also be achieved by a direct-lit backlight unit that includes a plurality of CCFLs, each having a light-emitting tube made from borosilicate glass doped with a UV absorbent in a range of 5.1 wt % to 9.0 wt %, phosphors coated on an inner surface of the light-emitting tube, mercury enclosed within the light-emitting tube, and a rare gas enclosed as a buffer gas within the light-emitting tube, and a diffusion plate made from a polycarbonate resin and disposed on a light-emission side of the backlight unit relative to the plurality of cold cathode fluorescent lamps. With this structure, 313 nm UV light is sufficiently blocked with the CCFLs in the backlight unit, making it possible to effectively suppress any reduction in the surface brightness of backlight units that employ diffusion plates made from PC resin.

BRIEF DESCRIPTION OF THE DRAWINGS

These and other objects, advantages, and features of the invention will become apparent from the following description thereof taken in conjunction with the accompanying drawings, which illustrate a specific embodiment of the present invention.

In the drawings.

DETAILED DESCRIPTION OF THE PREFERRED EMBODIMENT

Structure of Cold Cathode Fluorescent Lamp

A cold cathode fluorescent lamp (CCFL) pertaining to a preferred embodiment of the present invention is described below while referring to the diagrams.

Figure 1:
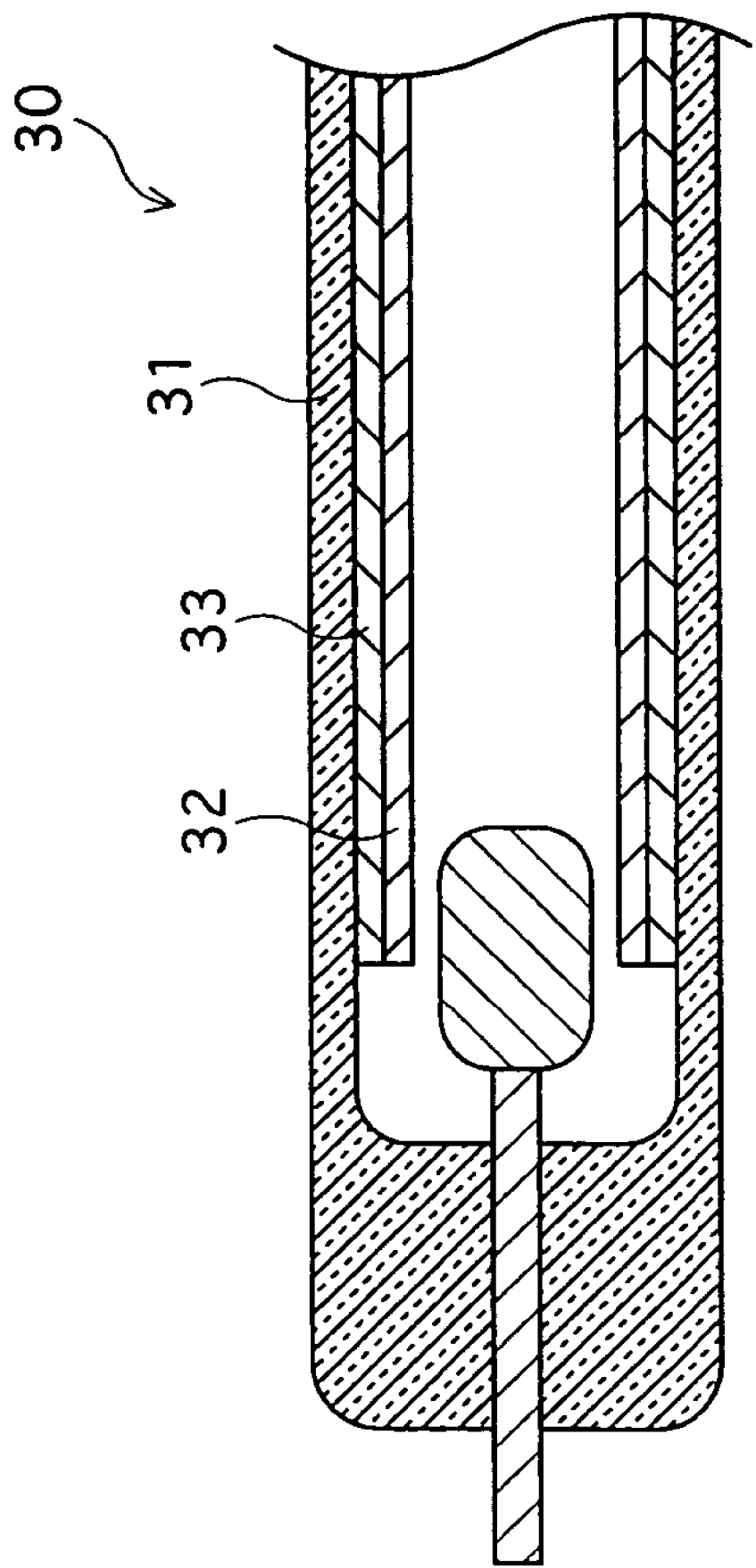
FIG. 1 is a schematic view showing a main section of a conventional cold cathode fluorescent lamp (CCFL)
Figure 2:
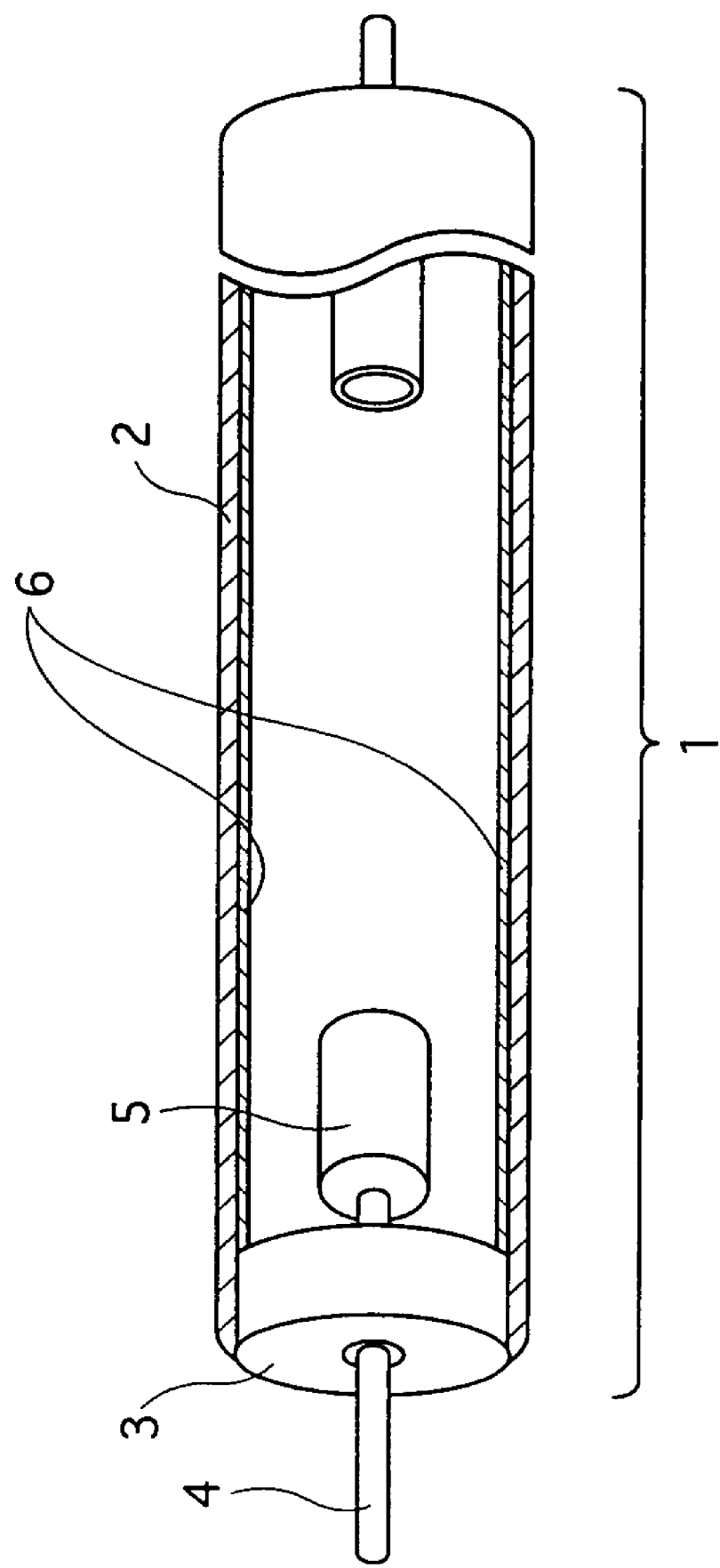
FIG. 2 is a schematic view showing a main section of a CCFL 1 pertaining to a preferred embodiment of the present invention.

FIG. 2 is a schematic view showing a main section of a CCFL 1 pertaining to the preferred embodiment. The structure of CCFL 1 basically conforms to the structure of CCFLs produced using conventional technology.

A light-emitting tube 2 formed using borosilicate glass ($SiO_2$—$B_2O_3$—$Al_2O_3$—$K_2O$—$TiO_2$) has an outer diameter of approximately 4.0 mm, an inner diameter of approximately 3.0 mm, and an overall length of approximately 720 mm. Note that the inner and outer diameters and overall length of light-emitting tube 2 are not limited to these measurements. Since light-emitting tube 2 in CCFL 1 preferably has a small diameter and thin walls, the outer diameter is generally set in a range of 1.8 mm to 6.0 mm (inner diameter: 1.4–5.0 mm).

Light-emitting tube 2 is doped with titanium oxide as a UV absorbent at a concentration of approximately 6.0 wt %. Note that the UV absorbent, not being limited to titanium oxide, may be cerium oxide or zinc oxide. The UV absorbent may also be one or a combination of the members of the group consisting of titanium oxide, cerium oxide and zinc oxide.

Note that the doping amount of UV absorbent, not being limited to a concentration of approximately 6.0 wt %, may be in a range of 5.1 wt % to 9.0 wt %. As clearly shown by the experiment results discussed below, it is possible with this range to sufficiently block 313 nm UV light. The experiment results also clearly show that 313 nm UV light cannot be sufficiently blocked when the doping amount of UV absorbent falls below 5.1 wt %. Conversely, when the doping amount of UV absorbent exceeds 9.0 wt %, light-emitting tube 2 loses transparency and turns a milky color due to the effects of the UV absorbent, thus resulting in a drop in CCFL brightness.

The doping amount of UV absorbent most preferably is in a range of 5.5 wt % to 6.5 wt %. As clearly shown by the experiment results discussed below, this range is optimal from the viewpoint of sufficiently blocking 313 nm UV light while at the same time not blocking light in a visible region (380–450 nm).

The transmissivity of light in the visible region can be improved by doping light-emitting tube 2 with 0 wt % to 1.0 wt % of a clarifier such as arsenic oxide ($As_2O_3$), antimony oxide ($Sb_2O_3$), sulfur oxide ($SO_3$), fluoride ($F_2$) and chlorine ($Cl_2$), to improve the transparency of the glass. Note that doping more than 1.0 wt % clarifier colors the glass, and conversely reduces the transmissivity of light in the visible region.

Light-emitting tube 2 is sealed airtight at each end by a piece of bead glass 3. In a vicinity of each end of tube 2, a lead wire 4 made from tungsten-nickel wire and having an approximately 0.8 mm diameter is sealed airtight by the tungsten wire part of the lead wire, so as to pass through bead glass 3. Furthermore, a cap-shaped electrode 5 made from nickel or niobium is attached to each lead wire 4 at the end disposed within tube 2. Note that the pieces of bead glass 3, lead wires 4 and electrodes 5 are not limited to the above structures.

Rare earth phosphors 6 formed from a mixture of red, green and blue phosphors ($Y_2O_3$:Eu, $LaPO_4$:Ce, Tb, and $BaMgAl_{16}O_{27}$:Eu, Mn) are applied to the inner surface of light-emitting tube 2. Tube 2 is filled with 0.8–2.5 mg mercury and a neon-argon mixed gas (Ne+5% Ar) having a cooled pressure of 10 kPa.

CCFL 1 is operated at a 40–120 kHz lighting frequency and a 3.5–8.5 mA lamp current, using an electronic stabilizer (not depicted).

Structure of Backlight Unit

Figure 3:
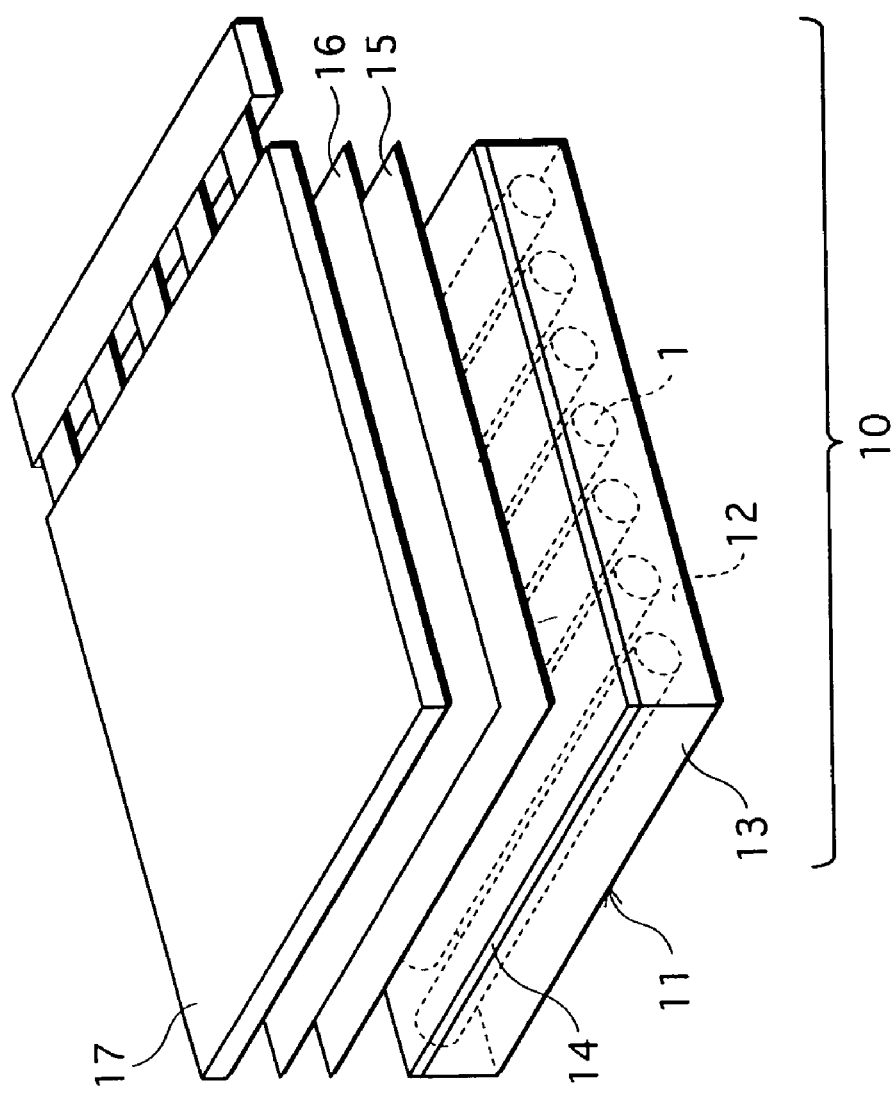
FIG. 3 is a schematic view showing a main section of a direct-lit backlight unit 10 pertaining to the preferred embodiment.

FIG. 3 is a schematic view showing a main section of a direct-lit backlight unit 10 pertaining to the preferred embodiment. The structure of backlight unit 10 basically conforms to the structure of backlight units produced using conventional technology.

An enclosure 11 made using a white PET (polyethylene terephthalate) resin is formed from a substantially rectangular reflection plate 12 and a plurality of side plates 13 disposed so as to surround the reflection plate. A plurality of evenly spaced CCFLs 1 is housed in a horizontal lighting direction within enclosure 11, so as to be close to reflection plate 12.

A diffusion plate 14 made using PC resin is disposed in enclosure 11, so as to face reflection plate 12 with the CCFLs interposed therebetween. In backlight unit 10, the side on which diffusion plate 14 is disposed relative to the CCFLs is the light-emission side of the backlight unit, while the side on which reflection plate 12 is disposed relative to the CCFLs is the light-reflecting side of the backlight unit. A diffusion sheet 15 made using PC resin and a lens sheet 16 made using acrylic resin are disposed on the light-emission side of diffusion plate 14 so as to overlap one another.

With an LCD TV that employs backlight unit 10, an LCD panel 17 of the TV is disposed on the light-emission side of lens sheet 16.

Note that backlight unit 10 is not limited to the above structure. Consider a typical configuration in which backlight unit 10 is used in a 32-inch LCD TV, for example. In this case, the measurements of enclosure 11 are set to a width of approximately 740 mm, a length of approximately 408 mm, and a depth of approximately 19 mm. Sixteen CCFLs 1 are disposed in enclosure 11 at equally spaced intervals of approximately 25.7 mm, with light-emitting tubes 2 in the CCFLs each being set to have an outer diameter of approximately 4.0 mm, an inner diameter of approximately 3.0 mm, and an overall length of approximately 720 mm. When backlight unit 10 is operated at a 5.5 mA lamp power, a surface brightness of approximately 8000 cd is obtained with lens sheet 16.

Effects of UV Light on Diffusion Plate

Figure 4:
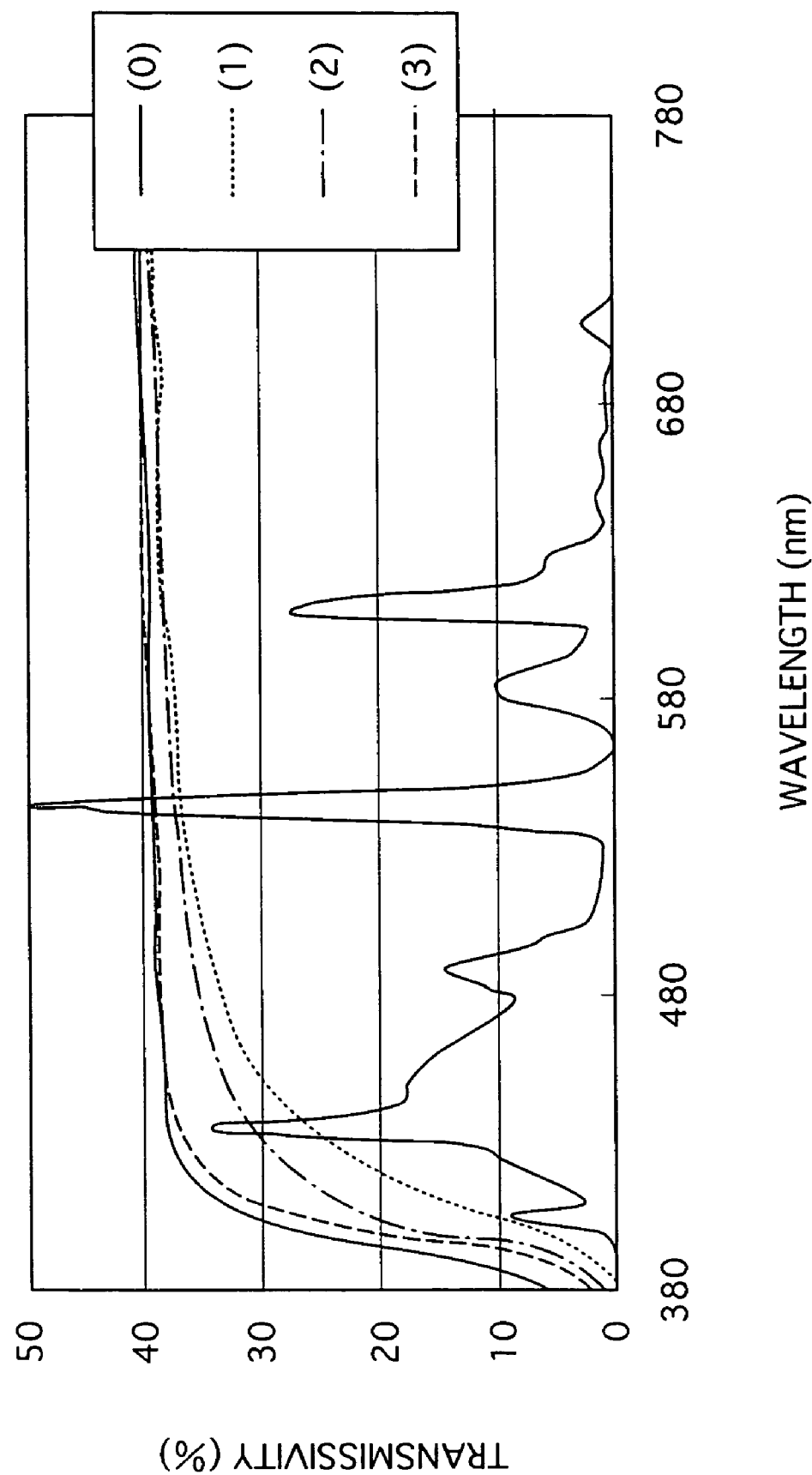
FIG. 4 shows the spectral transmissivity of a diffusion plate after UV irradiation.

FIG. 4 shows the spectral transmissivity of diffusion plate 14 after UV irradiation. Line (0) in FIG. 4 shows the spectral transmissivity of the diffusion plate in an initial state in which UV light has yet to be irradiated, line (1) shows the spectral transmissivity when irradiated with 254 nm, 313 nm and 365 nm UV light, line (2) shows the spectral transmissivity when irradiated with 313 nm and 365 nm UV light, and line (3) shows the spectral transmissivity when irradiated with 365 nm UV light.

Figure 5:
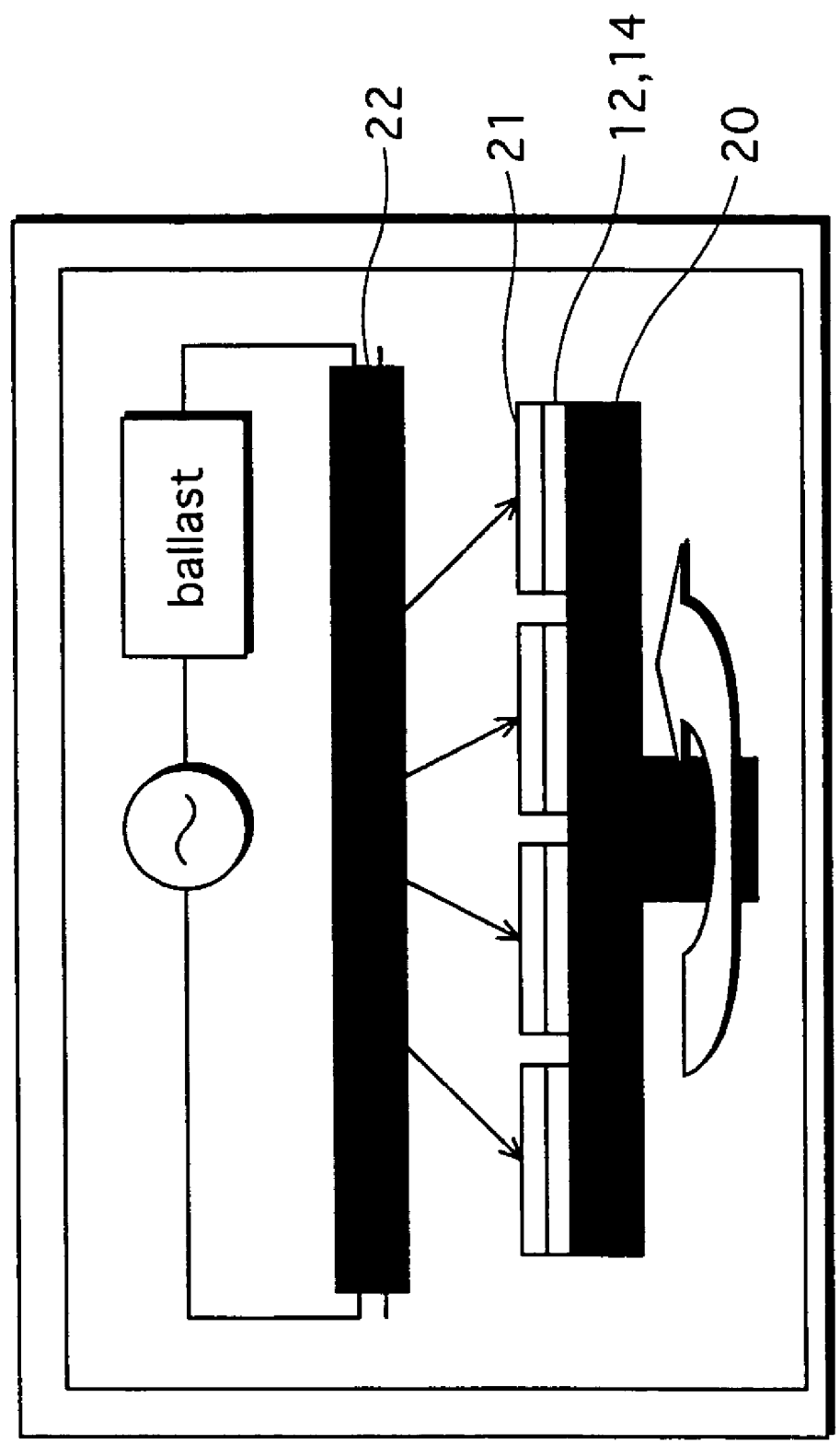
FIG. 5 is a schematic view showing a method for irradiating UV light onto diffusion and reflection plates.

FIG. 5 is a schematic view showing the UV irradiation method used in experiments. As shown in FIG. 5, diffusion plate 14 was set on a test platform 20, and irradiated for approximately 500 hours with UV light from UV lamps (20 W×3 lamps) via a UV filter 21. UV filter 21 cut UV light of specified wavelengths, allowing only UV light of the target wavelength(s) to be irradiated onto diffusion plate 14.

Note that the UV intensity of UV lamps 22 was approximately fifty times the UV intensity of CCFLs 1 (approx. 4.0 mm outer diameter, approx. 3.0 mm inner diameter, approx. 720 mm overall length) used in a 32-inch LCD TV, making it is possible to identify in a short time period the wavelength(s) that cause diffusion plate 14 to deteriorate/discolor.

In the FIG. 4 graph, there is no marked drop in the transmissivity of the visible region when the spectral transmissivity of lines (3) and (0) is compared. This tells us that 365 nm UV light does not impact greatly on the deterioration and discoloration of diffusion plate 14.

On the other hand, a marked drop in the transmissivity of the visible region is evident when the spectral transmissivity of lines (1) and (2) is compared with that of line (0). This tells us that 254 nm and 313 nm UV light impacts greatly on the deterioration and discoloration of diffusion plate 14. Note that to improve the blocking of UV light it is necessary to block 313 nm UV light, given that 254 nm UV light is already sufficiently blocked in conventional CCFLs.

Effects of UV Light on Reflection Plate

Figure 6:
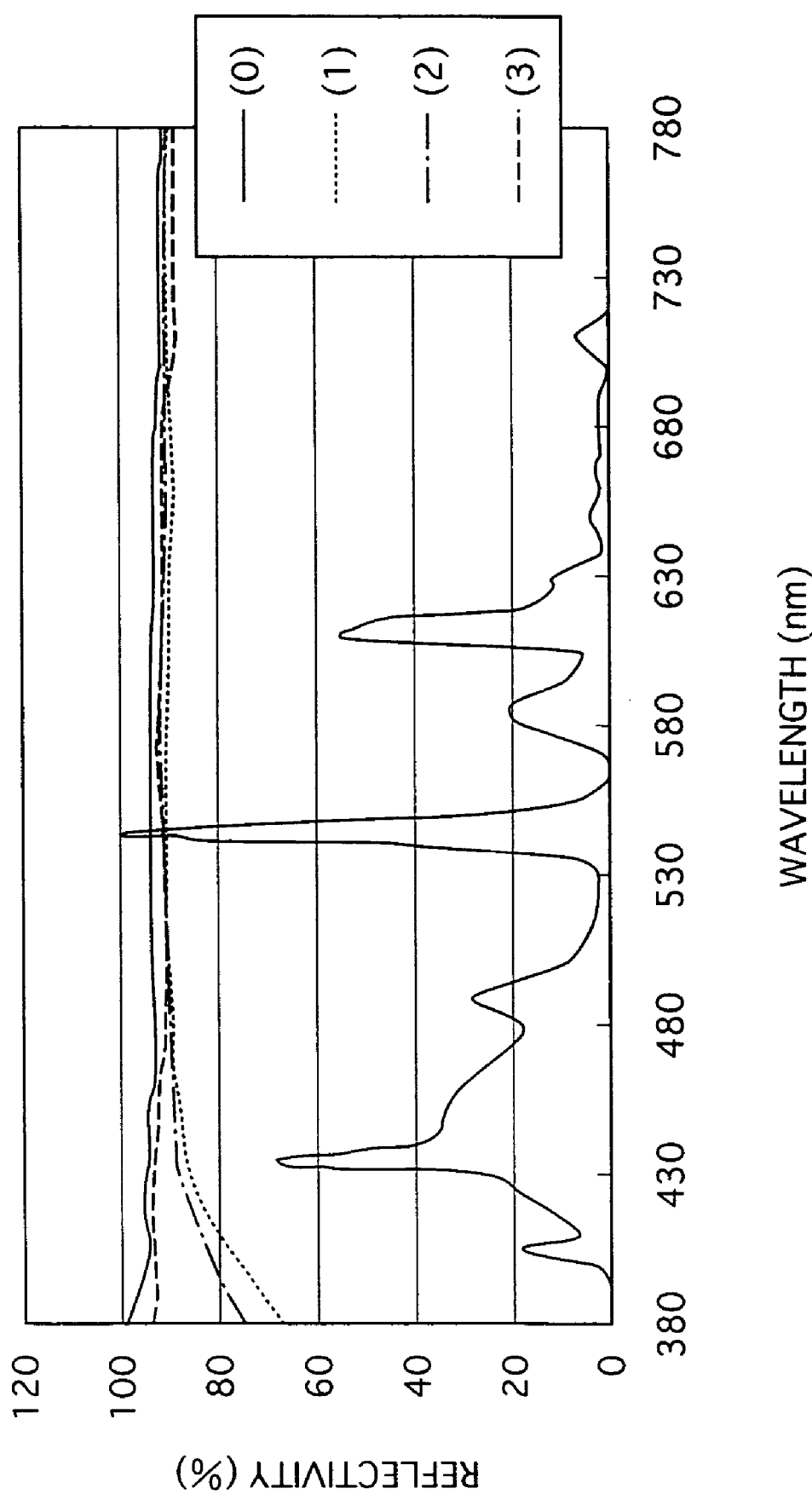
FIG. 6 shows the spectral reflectivity of a reflection plate after UV irradiation.

FIG. 6 shows the spectral reflectivity of reflection plate 12 after UV irradiation. Line (0) in FIG. 6 shows the spectral reflectivity of the reflection plate in an initial state in which UV light has yet to be irradiated, line (1) shows the spectral reflectivity when irradiated with 254 nm, 313 nm and 365 nm UV light, line (2) shows the spectral reflectivity when irradiated with 313 nm and 365 nm UV light, and line (3) shows the spectral reflectivity when irradiated with 365 nm UV light.

UV Light was irradiated onto reflection plate 12 using the same method as in the case of diffusion plate 14. As shown in FIG. 5, reflection plate 12 was set on test platform 20, and irradiated for approximately 500 hours with UV light from UV lamps (20 W×3 lamps) via UV filter 21. UV filter 21 cut UV light of specified wavelengths, allowing only UV light of the target wavelength(s) to be irradiated onto reflection plate 12.

Note that the UV intensity of UV lamps 22 was approximately fifty times the UV intensity of CCFLs 1 (approx. 4.0 mm outer diameter, approx. 3.0 mm inner diameter, approx. 720 mm overall length) used in a 32-inch LCD TV, making it possible to identify in a short time period the wavelength(s) that cause reflection plate 12 to deteriorate/discolor.

In the FIG. 6 graph, there is no marked drop in the reflectivity of the visible region when the spectral reflectivity of lines (3) and (0) is compared. This tells us that 365 nm UV light does not impact greatly on the deterioration and discoloration of reflection plate 12.

On the other hand, a marked drop in the reflectivity of the visible region is evident when the spectral reflectivity of lines (1) and (2) is compared with that of line (0). This tells us that 254 nm and 313 nm UV light impacts greatly on the deterioration and discoloration of reflection plate 12. As mentioned above, 313 nm UV light needs to be blocked to improve the blocking of UV light, since 254 nm UV light is already sufficiently blocked in conventional CCFLs.

Effects of Doping Amount of UV Absorbent on UV Blocking

Figure 7:
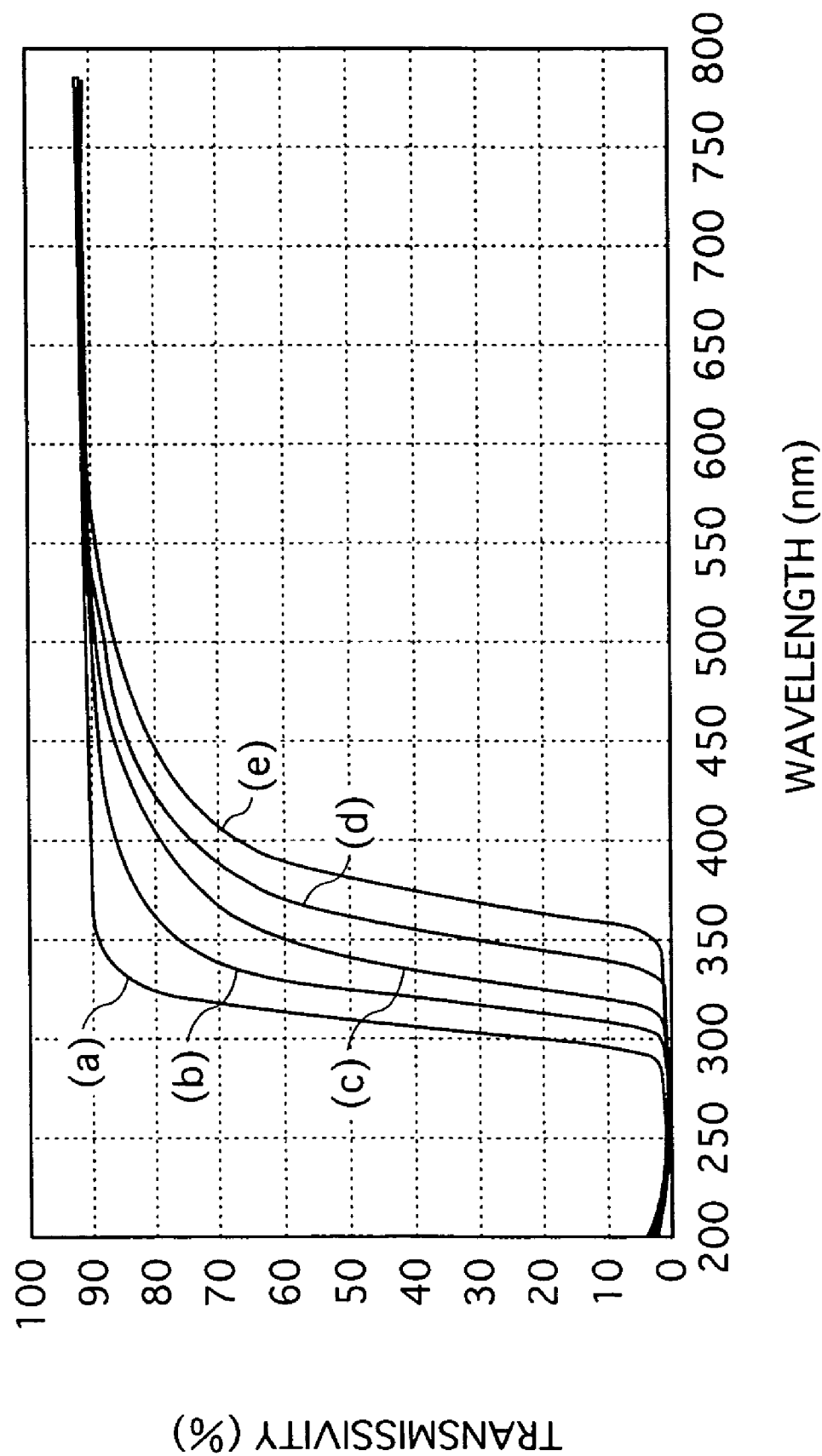
FIG. 7 shows the spectral transmissivity of borosilicate glass doped with titanium oxide.

FIG. 7 shows the spectral transmissivity of borosilicate-glass doped with titanium oxide.

Glass plates having a thickness of approximately 0.5 mm were made using borosilicate glass doped with titanium oxide, and the spectral transmissivity of the glass plates was measured. Curves (a) to (e) in FIG. 7 show the spectral transmissivity of glass plates doped with titanium oxide at 1.5 wt %, 3.0 wt %, 6.0 wt %, 9.0 wt % and 15.0 wt %, respectively.

The lower limit for the doping amount of titanium oxide is discussed firstly.

With curve (a), the transmissivity of 313 nm UV light is approximately 50%, which tells us that only approximately 50% of 313 nm UV light is blocked. The UV blocking effect is thus insufficient when the doping amount of titanium oxide is 1.5 wt %.

With curve (b), on the other hand, 313 nm UV transmissivity is approximately 10%, which tells us that approximately 90% of 313 nm UV light is blocked. In CCFL 1, 313 nm UV light is partially blocked by rare earth phosphors 6, which means that if 90% of 313 nm UV light is blocked by light-emitting tube 2, 313 nm UV light can be almost completely blocked for CCFL 1 as a whole.

Figure 8:
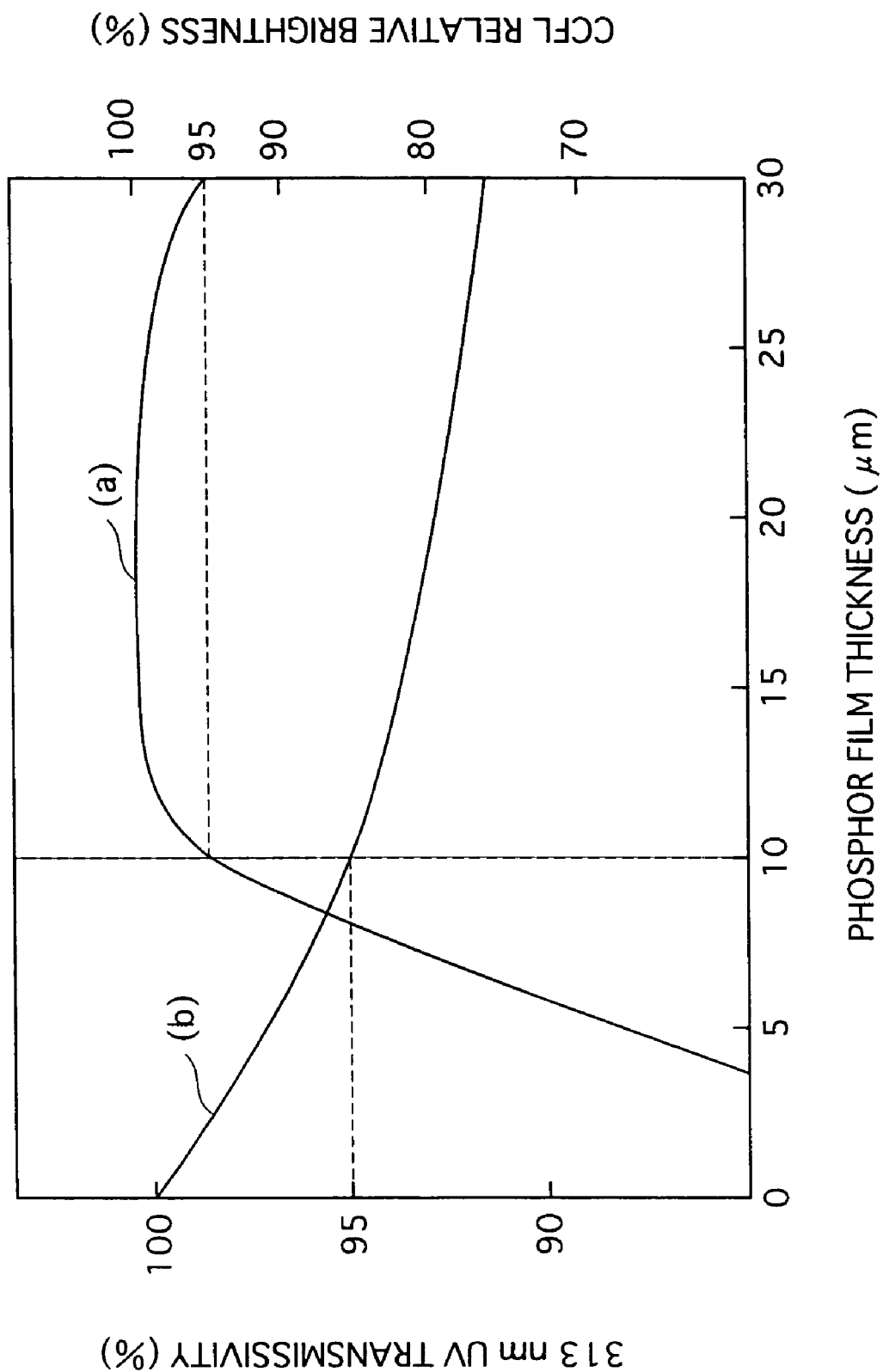
FIG. 8 shows the relation of phosphor film thickness with CCFL brightness and 313 nm UV transmissivity, respectively.

However, it is desirable for the UV blocking effect to be as high as possible so as to prevent diffusion plate 14 and reflection plate 12 from deteriorating or discoloring without risking the adverse effects of uneven phosphor application and the like. Experiments were thus performed to clarify the extent to which 313 nm UV light is blocked by phosphors 6, with the UV transmissivity demanded of light-emitting tube 2 being prescribed based on the results. FIG. 8 shows the relation of phosphor film thickness with CCFL brightness and 313 nm UV transmissivity, respectively.

Curve (a) in FIG. 8 shows the relation between the film thickness of phosphors 6 and the brightness of CCFL 1. From curve (a) we know that to obtain a desirable brightness (relative brightness of 95%+) for CCFL 1 in terms of commercial use, the film thickness of phosphors 6 needs to be in a 10–30 μm range.

Curve (b) in FIG. 8 shows the relation between the film thickness of phosphors 6 and 313 nm UV light. From curve (b) we know that the transmissivity of 313 nm UV light is 95% or less when phosphors 6 have a film thickness in the above desirable range (10–30 μm).

These results tell us that with CCFL 1 having a brightness level desirable for commercial use, phosphors 6 block at least 5.0% of 313 nm UV light. Consequently, 313 nm UV transmissivity can be reduced to substantially 0% for CCFL 1 as a whole if the 313 nm UV transmissivity of light-emitting tube 2 is kept at or below 5.0%, making it possible to effectively suppress any deterioration or discoloration of diffusion plate 14 and reflection plate 12.

Figure 9:
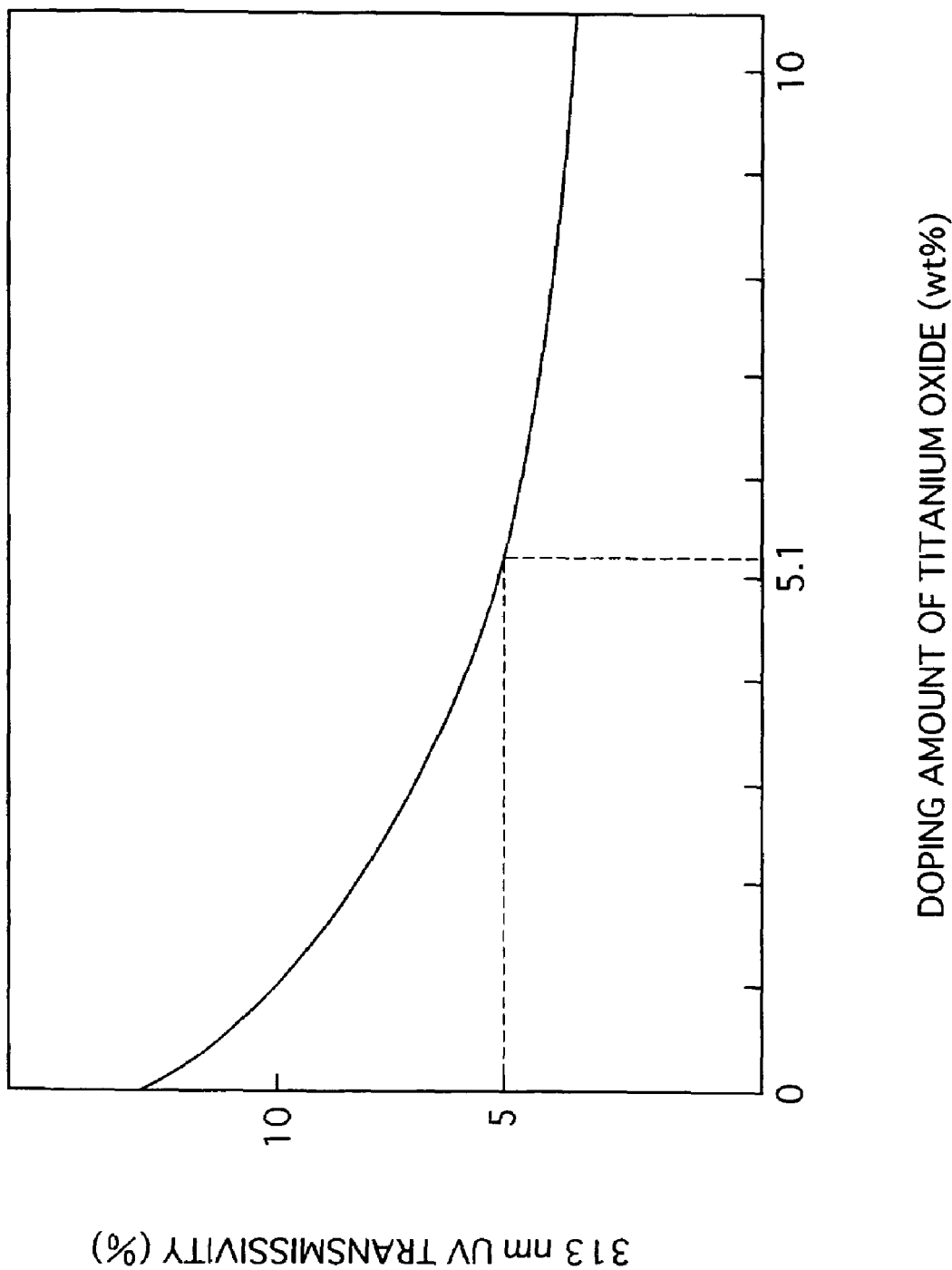
FIG. 9 shows the relation between the doping amount of titanium oxide and 313 nm UV transmissivity.

Investigations were then conducted into the amount of titanium oxide needed to achieve 313 nm UV transmissivity of 5.0% or less. FIG. 9 shows the relation between the doping amount of titanium oxide and 313 nm UV transmissivity. As clearly shown in FIG. 9, the transmissivity of 313 nm UV light falls within the desirable range ($\leq 5\%$) when the amount of titanium oxide is 5.1% or more. Thus we know that to effectively prevent any deterioration or discoloration of diffusion plate 14 and reflection plate 12, light-emitting tube 2 needs to be doped with at least 5.1% titanium oxide.

The upper limit for the doping amount of titanium oxide is discussed next.

To achieve a practical brightness level with CCFL 1, transmissivity at the 380 nm wavelength needs to be 70% or greater. In FIG. 7, the transmissivity at 380 nm is 70% with curve (d) relating to a 9.0% doping amount. From curve (d) we know that when the transmissivity at 380 nm is 70% or greater, there is no reduction in the transmissivity at 545 nm, this being the wavelength corresponding to the emission peak of the green phosphors, which have the greatest effect of brightness. Thus the upper limit of the doping amount of titanium oxide in terms of practical use is 9.0%.

However, UV transmissivity tends to drop off once the doping amount of titanium oxide exceeds 9.0 wt %, as revealed by curve (e) relating to a doping amount of 15 wt %. With curve (e), the reduction in transmissivity at the 545 nm emission peak of the green phosphors results in a marked drop in brightness.

This tells us that to achieve a practical brightness level with CCFL 1, the doping amount of titanium oxide needs to be 9.0 wt % or less. Note that with both curves (d) and (e), 313 nm UV transmissivity is substantially 0%, with 313 nm UV light thus being almost completely blocked.

From the above we know that 5.1 wt % to 9.0 wt % is an appropriate range for doping light-emitting tube 2 with titanium oxide, and that 313 nm UV light, which causes diffusion plate 14 and reflection plate 12 to deteriorate and discolor, can be sufficiently blocked within this range without reducing brightness.

Furthermore, given that curve (c) relating to a 6.0% doping amount shows that transmissivity around the 380 nm wavelength does not fall below approximately 75%, the doping amount of titanium oxide most preferably is set in a 5.1–6.0 wt % range, from the viewpoint of sufficiently blocking 313 nm UV light while at the same time blocking as little light in the visible region (380–450 nm) as possible.

Effects of Doping Amount of Titanium Oxide on UV Intensity

Figure 10:
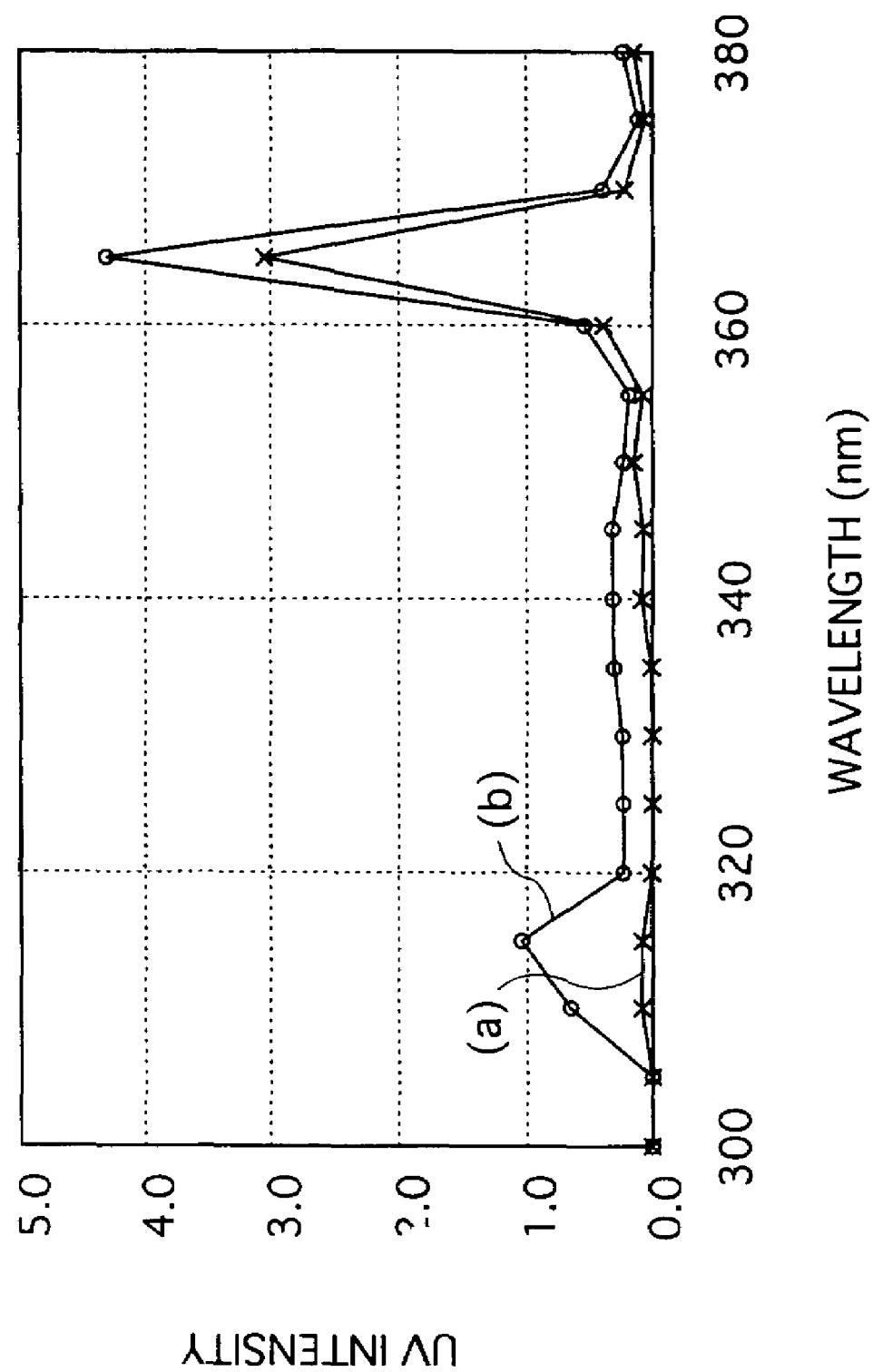
FIG. 10 compares the UV intensity of CCFLs.

FIG. 10 compares the UV intensity of CCFLs. Line (a) in FIG. 10 shows the UV intensity of CCFL 1 employing light-emitting tube 2 doped with 6.0 wt % titanium oxide, while line (b) shows the UV intensity of a CCFL employing a light-emitting tube doped with 0.5 wt % titanium oxide.

Note that UV intensity is calculated by dividing the UV absolute intensity by the brightness level. Note also that light-emitting tube 2 was here formed using borosilicate glass (70 wt % $SiO_{2-17}$ wt % $B_2O_{3-5}$ wt % $Al_2O_{3-2}$ wt % $K_2O$–6.0 wt % $TiO_2$+alkaline earth metal oxide).

In FIG. 10, the UV intensity of line (a) around 313 nm is markedly lower in comparison with line (b), which tells us that virtually no 313 nm UV light is irradiated from light-emitting tube 2 doped with 6.0 wt % titanium oxide. It can thus be concluded that 313 nm UV light can be sufficiently blocked if the doping amount of titanium oxide is 6.0 wt %.

Note that the brightness of CCFL 1 pertaining to line (a) is 23,200 $cd/m^2$, while the brightness of the CCFL pertaining to line (b) is 23,500 $cd/m^2$. It can thus be concluded that the brightness of CCFL 1 remains virtually unaffected, even when light-emitting tube 2 is doped with 6.0 wt % titanium oxide.

Temporal Change in Surface Brightness of Backlight Unit

Figure 11:
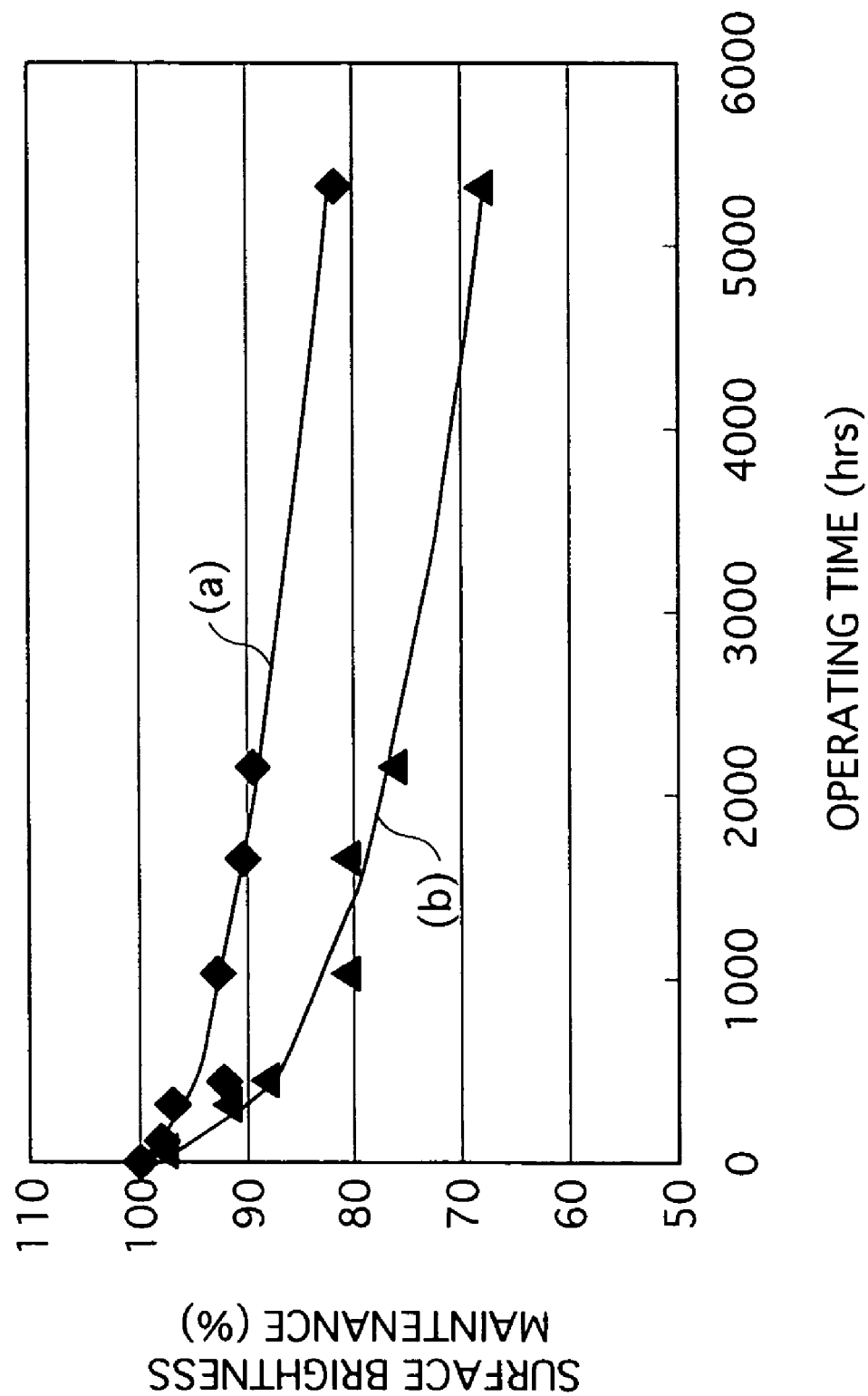
FIG. 11 compares the brightness maintenance of backlight units.

FIG. 11 compares the brightness maintenance of backlight units. In FIG. 11, lines (a) and (b) temporally show the surface brightness maintenance of the backlight units. Backlight unit 10 pertaining to line (a) was equipped with CCFL 1 employing light-emitting tube 2 doped with 6.0 wt % titanium oxide. The backlight unit pertaining to line (b) was equipped with a CCFL employing a light-emitting tube doped with 0.5 wt % titanium oxide. Note that light-emitting tube 2 was here formed using borosilicate glass (70 wt % $SiO_{2-17}$ wt % $B_2O_{3-5}$ wt % $Al_2O_{3-2}$ wt % $K_2O$–6.0 wt % $TiO_2$ + alkaline earth metal oxide).

As clearly shown in FIG. 11, any reduction in the surface brightness maintenance of backlight unit 10 pertaining to line (a) is markedly suppressed over the operating time, in comparison with the backlight unit pertaining to line (b). It can thus be concluded that backlight unit 10 has a longer life than the backlight unit of line (b).

Note that having visibly checked for deterioration and discoloration of the diffusion and reflection plates of the backlight units of lines (a) and (b) after approximately 4000 operating hours, absolutely no deterioration or discoloration of diffusion plate 14 and reflection plate 12 was evident with backlight unit 10 of line (a), whereas deterioration and discoloration of the diffusion and reflection plates was evident with the backlight unit of line (b).

As described above, CCFL 1 in the preferred embodiment is able to effectively prevent any deterioration or discoloration of diffusion plate 14, reflection plate 12, diffusion sheet 15 and lens sheet 16 in backlight unit 10 equipped with CCFL 1, owing to 313 nm UV light being sufficiently blocked. Backlight unit 10 thus has a long life, with any drop in surface brightness during operation being markedly suppressed.

The present invention, while having been described in detail above based on the preferred embodiment of a CCFL and a backlight unit, is not limited to this preferred embodiment.

High-vision technology for LCD TVs has been evolving particularly in recent years, with the surface brightness of backlight units having been boosted by increasing the number of CCFLs, for example, given that high-vision LCD TVs require a smaller aperture ratio than normal LCD TVs and high surface brightness.

Raising the surface brightness of the backlight unit in this way leads to an increase in the amount of 254 nm and 313 nm UV light, which severely deteriorates and discolors the diffusion and reflection plates, and conversely causes a drop in the surface brightness of the backlight unit. However, this problem is resolved by using a CCFL according to the present invention.

Furthermore, while there have been increasing demands in recent years for longer life LCD TVs, an example of which is the call for LCD TVs having an operating time in excess of 60,000 hrs, the life of LCD TVs can be extended by using a CCFL according to the present invention, owing to the fact that reductions in the surface brightness of the backlight unit can be greatly suppressed.

A CCFL and backlight unit according to the present invention can be used in LCD TVs and other LCD display devices, and are particularly suited to large LCD TVs, large LCD monitors and high-vision LCD TVs equipped with direct-lit backlight units that employ PC resin diffusion plates.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A cold cathode fluorescent lamp comprising:
    a light-emitting tube made from borosilicate glass doped with an ultraviolet light absorbent in a range of 5.1 wt % to 9.0 wt %;
    phosphors coated on an inner surface of the light-emitting tube;
    mercury enclosed within the light-emitting tube; and
    a rare gas enclosed as a buffer gas within the light-emitting tube.

2. The cold cathode fluorescent lamp of claim 1, wherein the ultraviolet light absorbent is at least one member selected from the group consisting of titanium oxide, cerium oxide and zinc oxide.

3. A direct-lit backlight unit that comprises a cold cathode fluorescent lamp having a light-emitting tube made from borosilicate glass doped with an ultraviolet light absorbent in a range of 5.1 wt % to 9.0 wt %, phosphors coated on an inner surface of the light-emitting tube, mercury enclosed within the light-emitting tube, and a rare gas enclosed as a buffer gas within the light-emitting tube.

4. A direct-lit backlight unit comprising a cold cathode fluorescent lamp having a light-emitting tube made from borosilicate glass doped with an ultraviolet light absorbent in a range of 5.1 wt % to 9.0 wt %, phosphors coated on an inner surface of the light-emitting tube, mercury enclosed within the light-emitting tube, and a rare gas enclosed as a buffer gas within the light-emitting tube, the ultraviolet light absorbent being at least one member selected from the group consisting of titanium oxide, cerium oxide and zinc oxide.

5. A direct-lit backlight unit comprising:
    a plurality of cold cathode fluorescent lamps, each having a light-emitting tube made from borosilicate glass doped with an ultraviolet light absorbent in a range of 5.1 wt % to 9.0 wt %, phosphors coated on an inner surface of the light-emitting tube, mercury enclosed within the light-emitting tube, and a rare gas enclosed as a buffer gas within the light-emitting tube; and
    a diffusion plate made from a polycarbonate resin and disposed on a light-emission side of the backlight unit relative to the plurality of cold cathode fluorescent lamps.

6. A direct-lit backlight unit comprising:

a plurality of cold cathode fluorescent lamps, each having a light-emitting tube made from borosilicate glass doped with an ultraviolet light absorbent in a range of 5.1 wt % to 9.0 wt %, phosphors coated on an inner surface of the light-emitting tube, mercury enclosed within the light-emitting tube, and a rare gas enclosed as a buffer gas within the light-emitting tube, the ultraviolet light absorbent being at least one member selected from the group consisting of titanium oxide, cerium oxide and zinc oxide; and a diffusion plate made from a polycarbonate resin and disposed on a light-emission side of the backlight unit relative to the plurality of cold cathode fluorescent lamps.

* * * * *